(12) United States Patent
Parkinson

(10) Patent No.: US 8,114,283 B2
(45) Date of Patent: Feb. 14, 2012

(54) SEPARATOR TO SEPARATE A LIQUID/LIQUID/GAS/SOLID MIXTURE

(75) Inventor: David J. Parkinson, Clevedon (GB)

(73) Assignee: DPS Bristol (Holdings) Limited, Bristol (GB)

( * ) Notice: Subject to any disclaimer, the term of this patent is extended or adjusted under 35 U.S.C. 154(b) by 926 days.

(21) Appl. No.: 11/816,887

(22) PCT Filed: Feb. 22, 2006

(86) PCT No.: PCT/GB2006/000615
§ 371 (c)(1),
(2), (4) Date: May 5, 2008

(87) PCT Pub. No.: WO2006/090140
PCT Pub. Date: Aug. 31, 2006

(65) Prior Publication Data
US 2009/0020467 A1    Jan. 22, 2009

(30) Foreign Application Priority Data

Feb. 23, 2005   (GB) .................................. 0503773.4

(51) Int. Cl.
*C02F 1/24* (2006.01)
(52) U.S. Cl. ................... 210/221.2; 210/512.1; 210/202
(58) Field of Classification Search .............. 210/221.1, 210/221.2, 512.1, 202
See application file for complete search history.

(56) References Cited

U.S. PATENT DOCUMENTS

| 3,545,468 | A | | 12/1970 | Freeman et al. |
| 4,617,031 | A | | 10/1986 | Suh et al. |
| 4,913,819 | A | * | 4/1990 | Patterson ..................... 210/523 |
| 5,407,584 | A | | 4/1995 | Broussard, Sr. |
| 5,522,999 | A | * | 6/1996 | Broussard ..................... 210/703 |
| 5,879,541 | A | | 3/1999 | Parkinson et al. |

FOREIGN PATENT DOCUMENTS

| GB | 2332632 | | 6/1999 |
| RU | 2043304 C1 | * | 9/1995 |
| WO | WO-2005056483 | | 6/2005 |

OTHER PUBLICATIONS

"Abstract" from Research Disclosure, Mason Publications Vo. 341, No. 2, Sep. 1992 (ISSN: 0374-4353; XP007118079).

* cited by examiner

*Primary Examiner* — Thomas M Lithgow
(74) *Attorney, Agent, or Firm* — Honigman Miller Schwartz and Cohn LLP

(57) ABSTRACT

A separator for separating or partially separating oil, water, gas and solids from hydrocarbon production well fluids comprises a vessel and a cyclone contained within the vessel. An inlet passage passes through a wall of the vessel and into the cyclone, the inlet passage having means for causing the flow to rotate within the cyclone. A first outlet passage for an oil rich phase extends from a position within the cyclone and substantially on a central axis of the cyclone; a second outlet passage for a water phase extends from a base of the vessel; and a third outlet passage for the solids extends from a lower end of the cyclone.

24 Claims, 3 Drawing Sheets

SEPARATOR TO SEPARATE A LIQUID/LIQUID/GAS/SOLID MIXTURE

The present invention relates to a separator and particularly, but not exclusively, to a separator for separating or partially separating oil, water, gas and solids from hydrocarbon production well fluids.

BACKGROUND TO INVENTION

Production of hydrocarbons particularly from remote or marginal oil and gas fields offshore is proving to be of significant importance to oil companies, and the economies of some oil producing countries. The larger oil discoveries are now in the minority, and are in many instances starting to, or are, suffering a production bottleneck caused by high water production rates. It is the economic field life extension of these and the development of the smaller reserves of recoverable oil, particularly in deep water, or a long distance from any other facilities, that creates the need for a new generation compact separator.

To continue to produce or bring into production such fields in an economically and environmentally secure method, it would be beneficial to separate the bulk of any produced water, particularly when the field has entered its water continuous phase, either at the front-end of the separation process on the surface or on the sea bed. The majority of unwanted by-products from the oil well, such as the produced water and solids, will need to be managed by either discharge to the environment whilst meeting the rules in place for doing so, or by reinjection into a disposal or pressure maintenance zone in the vicinity of the producing well, in some cases solids may have to be transported to the shore for treatment and disposal. All of this must be achieved whilst managing large intermittent volumes of the gas, solids, oil and water, known in the industry as "slugs". It has been the management of these slugs that has historically used large pressure vessels with a three minute or more retention or hold up time, or slug inhibition methods to smooth out this intermittent or slugging flow.

STATEMENT OF INVENTION

According to the present invention there is provided a separator for separating out a flow into a first fluid, a second fluid which is denser than the first fluid, and solids, the separator comprising:
a vessel, a cyclone contained within the vessel, an inlet passage passing through a wall of the vessel and into the cyclone, the inlet passage having means for causing the flow to rotate within the cyclone;
a first outlet passage for the first fluid extending from a position within the cyclone and substantially on a central axis of the cyclone;
a second outlet passage for the second fluid extending from a base of the vessel; and
a third outlet passage for the solids extending from a lower end of the cyclone.

The upper end of the cyclone may be open to the vessel and, in use, the second fluid may overflow the cyclone into the vessel.

The vessel may be substantially symmetrical about its central vertical axis.

The vessel may be cylindrical.

Means may be provided for causing the flow to rotate within the cyclone comprising shaping or aligning the inlet passage to direct inlet flow away from the central axis of the cyclone.

A gas vent may be provided in an upper part of the vessel.

The third outlet passage may include a fluidising unit situated in the cyclone.

A further passage may be provided for ducting water to the fluidising unit.

A vortex seat or core finder may be positioned in the cyclone above the fluidising unit.

The first outlet passage may have slots which open into a part of the cyclone at which the first fluid accumulates as it separates out.

A filter may be provided in a space between the cyclone and the vessel.

A gas inlet and distributor means may be provided in the base of the vessel.

The second outlet passage may be controlled by a vortex valve level control means.

A core shield may be provided at an open end of the cyclone.

According to a second aspect of the invention, a system may be provided in which a pipeline is connected to the first outlet of the separator, a pump is provided in the pipeline for increasing the pressure of flow through the first outlet, and an inductor or jet pump is provided in the pipeline downstream of the pump, the inductor or jet pump being connected to a gas vent of the separator.

The pipeline may be connected to downstream equipment at a higher pressure than the separator.

It is an advantage of the invention that it provides a reliable method of removing, at least 80% of the produced water from a well bore stream. It also provides management of solids, so that the liquid volumetric flowrates to a riser or through an existing separation process are reduced, thus allowing more wells to be drilled and produced with existing facilities. This in many cases could increase the production economics and recoverable reserves of both existing oil production facilities offshore, new offshore installations and offshore marginal fields.

Advantageously, the system is able to manage slugs of fluids and solids without a process upset, hence affording the separator a high turn down ratio for each phase to be separated.

BRIEF DESCRIPTION OF THE DRAWINGS

For a better understanding of the present invention, and to show more clearly how it may be carried into effect, reference will now be made, by way of example, to the accompanying drawings, in which:—

DETAILED DESCRIPTION OF PREFERRED EMBODIMENTS

Figure 1:
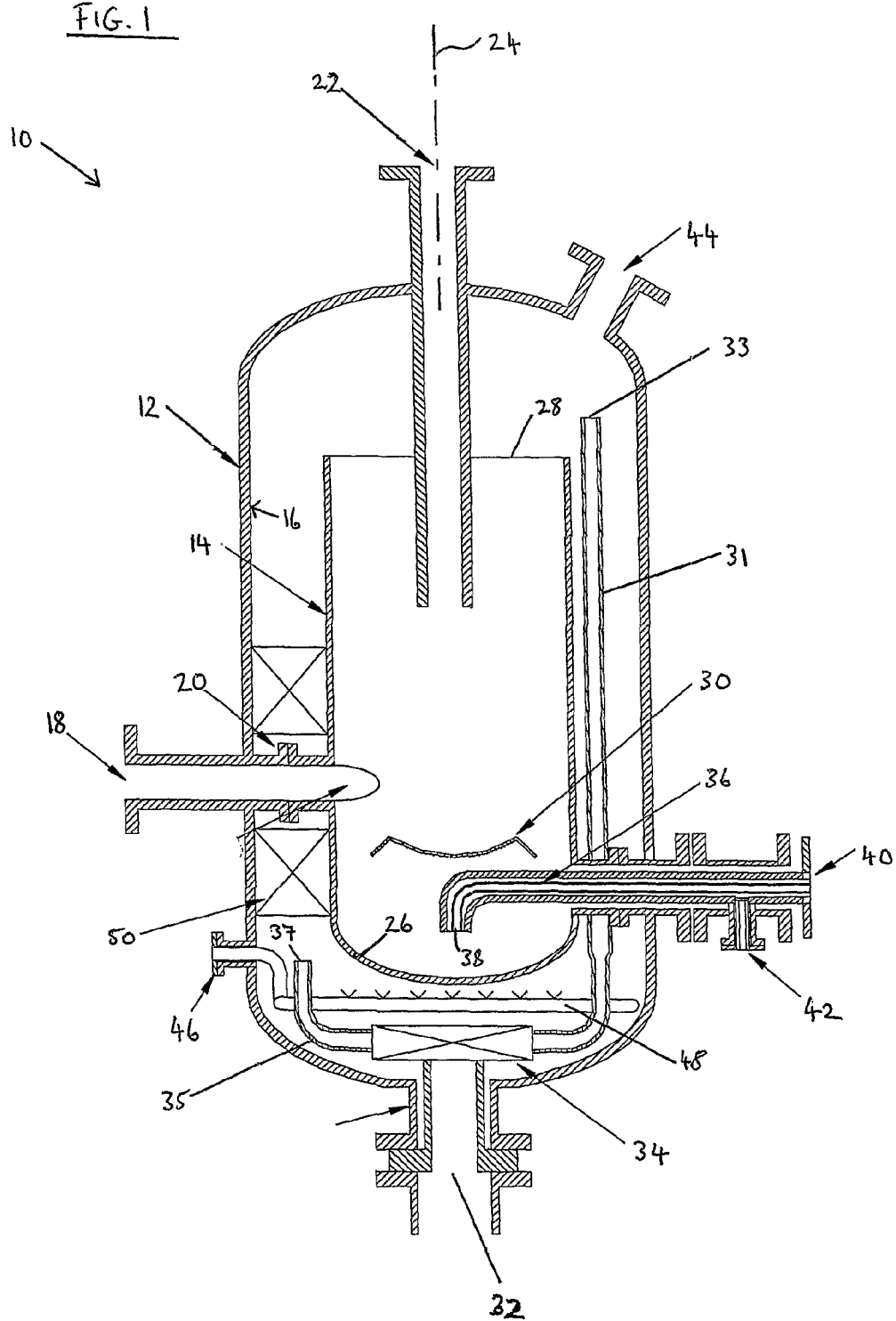
FIG. 1 is a cross-section through a first embodiment of a separator in accordance with the present invention.

Referring firstly to FIG. 1, a first embodiment of a separator is indicated generally at 10. The separator comprises a pressure vessel or tank 12 and a cyclone 14 mounted within the pressure vessel 12, spaced from the wall 16 of the pressure vessel. The pressure vessel 12 is substantially cylindrical with domed ends, and has a central vertical axis indicated at 24. The cyclone 14 is mounted coaxially inside the pressure vessel 12. An inlet passage 18 extends through the wall 16 of the pressure vessel 12, across an internal annular space 20 between the pressure vessel and the cyclone 14, and into the cyclone 14. The inlet passage 18 opens into the cyclone 14 tangentially, and is shaped to cause fluids entering the cyclone through the passage 18 to rotate, and hence to cause a swirling flow or vortex flow regime in the cyclone 14.

The cyclone 14 is also substantially cylindrical, with a closed lower end 26 and an open upper end 28. A core finder 30, alternatively known as a vortex seat, is positioned at the base of the cyclone, spaced from the lower end 26 of the cyclone, where separated solids can accumulate.

A first outlet passage 22 for an oil rich phase extends through the upper end of pressure vessel wall along the axis 24, through the open upper end 28 of the cyclone 14 and terminates at a position directly above and spaced from the core finder 30, where an oil pad or vortex core will exist.

A second outlet passage 32 for a continuous water phase is provided in the base of the pressure vessel 12, and is connected to a vortex valve level control means 34. Alternatively, the outlet passage 32 is connected to a liquid level control or an oil in water content quality control means.

A first tube 31 extends from one side of the vortex valve level control means 34, between the cyclone 14 and the pressure vessel wall 16, and terminates in an open end 33. The open end 33 is positioned above the open upper end 28 of the cyclone. A second tube 35 extends from the other side of the vortex valve level control means 34 and terminates in an open end 37, substantially level with the base of the cyclone in the vessel. The vortex valve level control means 34 controls the flow of the continuous water phase from the separator.

The outlet 32 may report via a valve means either directly to an injection/disposal well or zone via an injection pump, or to any type of water polishing unit, such as a liquid/liquid de-oiling hydrocyclone, an oil from water filtration apparatus, a flotation device or a plate separator (not shown), in order to further reduce the oil in water content of the produced water. The water may also need further de-gassing prior to disposal to the sea or re-injection.

A third outlet passage 36 for solids is provided through the pressure vessel wall 16, which terminates in a downwardly facing opening 38, beneath the core finder 30 (as viewed). The outlet passage 36 is part of a fluidising unit 40, also comprising a water inlet 42, which when fed with a fluid at a higher pressure than that existing in vessel 12 fluidises settled solids in the base of the blind cyclone 14 and directs them to the outlet passage 36 for disposal or further treatment.

A fourth outlet passage 44, primarily for gas, is provided in the upper end of the pressure vessel 12. The outlet passage 44 may also be used for control of pressure in the vessel 12, to remove oil from the pressure vessel, and to input a higher pressure gas under certain circumstances.

A coalescing plate pack or filter media 50 is positioned in the annular space 20. The coalescing material is designed to Increase any oil droplet size distribution in the separated produced water in order to aid further tertiary treatment. Thus the coalescing or filter media inhibits oil drops from passing to the base of the pressure vessel 12, thus creating an oil pad, which will periodically sloth off. The released oil rises to the upper part of separator into the oil rich core in the cyclone and out through the outlet 22 under Stokes law.

A gas inlet 46 and distributor means 48 is arranged in the base of the pressure vessel 12, underneath the cyclone 14 (as viewed) through which gas can be injected in order to create a blanket of fine bubbles to rise in the annular space between the cyclone and pressure vessel wall. This assists the separation of oil drops from the separated produced water. Such gas could also be in the form of condensate in liquid form which can have the effect of drawing, by mass transfer, dissolved oil out of the water phase as it rises through the annular space 20 and reports to the first or fourth outlets 22,44. Inlet 46 and distributor means 48 may also be used to inject de-emulsifying chemicals as required.

In use, fluids from a production well or wells report to the separator 12 through the inlet passage 18 and set up a swirling flow or vortex flow regime in the cyclone 14. The core finder 30 captures and reflects the vortex core produced by the rotational motion of the fluids in the cyclone 14. Free gas migrates upwards and collects in the domed upper end of the pressure vessel 12 and exits the separator 10 under pressure control from the gas outlet 44. A continuous oil rich phase reports under differential pressure control to the outlet passage 22.

A continuous water phase overflows the open end of the cyclone 14 and exits the separator 10 by means of the vortex valve level control means 34, through the outlet 32. The water passes initially out of the second tube 35 and into the valve 34 where a vortex flow regime is established. The flow to the outlet passage 32 is at a minimum. When the water flow over the cyclone increases, the water level increases in the vessel until it overflows the first tube 31. The tubes 31,35 enter the valve 34 tangentially opposed, and hence when water flows through both tubes, the vortex regime is destroyed and the water leaves the passage 32 at maximum flow. This controls the level of water in the separator.

Solids, which settle beneath the core finder 30 are removed by the fluidising apparatus 40. The separator 10 has a hold-up (or retention) time of 10 to 60 seconds.

Figure 2:
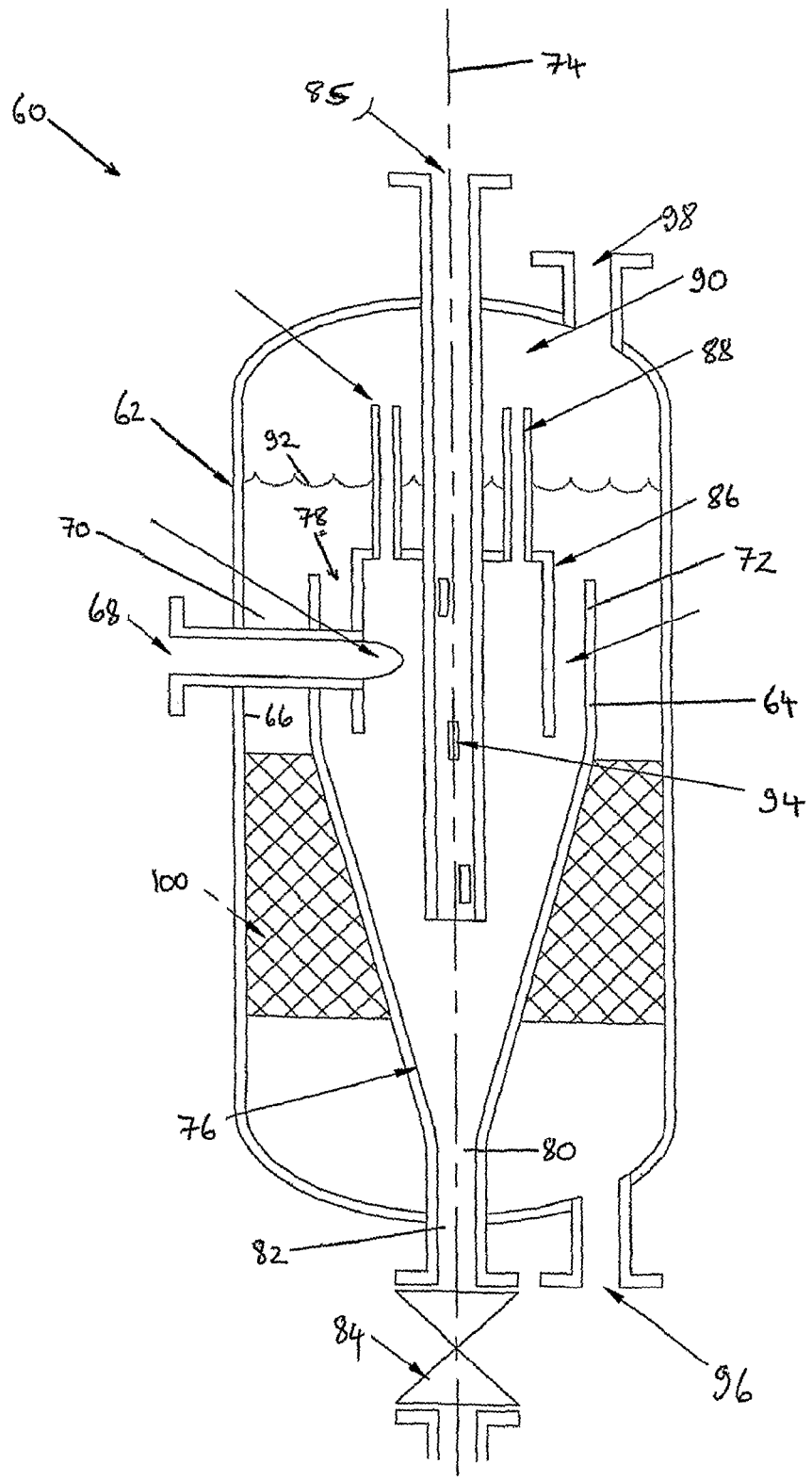
FIG. 2 is a cross section through a second embodiment of a separator in accordance with the present invention.

Referring now to FIG. 2, a second embodiment of a separator is indicated at 60. The separator 60 comprises a pressure vessel or tank 62 and a cyclone 64 mounted within the pressure vessel 62, spaced from the wall 66 of the pressure vessel. The pressure vessel 62 is substantially cylindrical with domed ends, and has a central vertical axis indicated at 74. The cyclone 64 is mounted coaxially inside the pressure vessel 62. An inlet passage 68 extends through the wall 66 of the pressure vessel 62, across an internal annular space 70 between the pressure vessel and the cyclone 64, and into the cyclone. The inlet passage 88 opens into the cyclone 64 tangentially, and is shaped to cause fluids entering the cyclone through the passage 68 to rotate, and hence to cause a swirling flow or vortex flow regime in the cyclone 64.

The cyclone 64 has a substantially cylindrical upper portion 72, an open upper end 78, a conical lower portion 76 and a lower end 80 leading to an exit passage 82 and a valve 84, which can be opened periodically to allow the release of accumulated solids.

As in the previous embodiment, the separator 60 has an outlet passage 85 for an oil rich phase extending through the upper end of pressure vessel wall along the axis 74, through the open upper end 78 of the cyclone 64 and terminating at a position approximately half way down the conical lower portion 76 of the cyclone 64, where an oil pad or vortex core will exist. A series of slots or openings 94 allow the oil rich stream to enter the outlet passage 84. The slots 94 are designed to minimise gas collection in the oil rich stream. A core shield 86 is provided in the upper open end 78 of the cyclone 64, which incorporates a plurality of gas up-corners 88, i.e. tubes, which extend towards the upper domed end of the vessel 62. The purpose of the core shield 86 is promote high ratios of axial to rotational flows (swirl) within the cyclone 64 to accelerate the formation of the oil rich vortex core and to release free gas to the gas up-corners 88. A gas space or cap, indicated at 90, accumulates above the liquid level in the separator, indicated at 92. The outlet passage 85, known also as a dip tube, can have a spiral auger on its outer surface, which aids gas migration to the gas up-corners 88.

An outlet passage 96 for the water phase is provided in the domed bottom end of the vessel 62, and an outlet passage 98 for the gas phase is provided in the domed upper end of the vessel. As in the previous embodiment, a coalescing plate pack or filter media 100 is positioned in the annular space 70. The water phase overflows the open upper end 78 of the cyclone 64, passes through the coalescing plate pack or filter media, and exits through the outlet passage 96.

Figure 3:
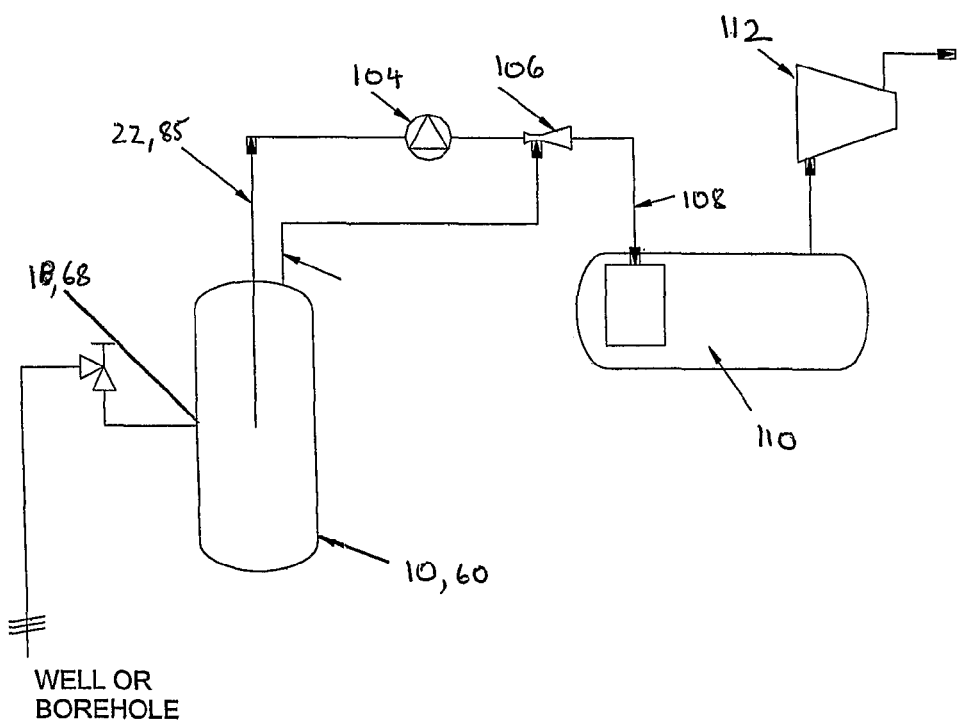
FIG. 3 shows a schematic arrangement of a process incorporating a separator as shown in FIG. 1 or FIG. 2, including a pump means for increasing the pressure across an oil rich outlet of the separator in order to feed an inductor or jet pump, which draws gas from the separator into a pipeline or down stream equipment at a higher pressure than the separator.

A system, incorporating one of the separators 10,60 is shown in FIG. 3. Hydrocarbon production well fluids from a well or borehole are piped to the inlet passage 16,68 of the separator. A pump 104 is connected to the oil rich outlet 22,85, which increases the pressure of the outlet in order to feed an inductor or jet pump 106 with sufficient motive power to draw gas from the separator's gas outlet into a pipeline 108 or down stream equipment 110, which is at a higher pressure than separator. The downstream equipment 110, may be, for example, 20 km away from the separator 10,60.

This system provides two advantages. Firstly, the down stream equipment 110 can be maintained at its optimum operating pressure to feed, for example, an existing gas compressor 112, regardless of the pressure losses across the separator and in the pipeline 108. This is important when retrofitting separation equipment upstream of existing process apparatus to manage high water cuts. Secondly, the system can be used to reduce hydrostatic head operating on the well in question and to boost flow rate from the well, in particular, by only pumping the oil rich stream which will be of reduced volume with less associated gas, making the system more cost effective and simpler to maintain compared with that of subsea boosting.

Each separator described herein is a type of compact free water knockout vessel (removal of produced water from a three phase oil, gas and water stream) that uses an embedded blind cyclone unit best described as a simple cyclonic device having a tangential fluid inlet, an outlet for the oil rich stream which reports to the outside of the separator and a liquid overflow outlet or weir in the open top section available for continuous flow. Another outlet for intermittent or batch use for the removal of solids is optionally provided. The dip tube used to communicate with the blind cyclone's axial centre may move vertically up or down the blind cyclone's axis in order to be positioned in the optimum point in the blind cyclone's body. In practice, the dip tube, or oil rich outlet passage is at a lower pressure than the separator vessel.

An insert (not shown) can optionally be provided in the inlet passage 18,68 of each separator, which reduces the cross sectional area of the inlet passage, and therefore increases the flow velocity of the inlet fluids. This increases swirl or rotational velocity in the cyclone, and has the effect of reducing the retention time in the separator.

The blind cyclone in the first embodiment described also has a fluidising unit for removing trapped solids from its base to outside the blind cyclone's tank or pressure vessel for delivery in the form of slurry for further treatment or storage following a de-gassing stage. Water is displaced by the blind cyclones enhanced centrifugal forces to the blind cyclones wall, where it is forced to travel upwards to overflow the top of the blind cyclone outer wall. It is an important feature, that the oil rich outlet does not re-entrain solids or gas. The separator can be controlled by pressure differentials and or levels, with an override provision based on water quality measurement if required.

The separator is generally intended to be operated at above atmospheric pressure, but it may alternatively be operated at below atmospheric pressure or may be open to the atmosphere. Advantageously, the vessel is a fluid tight pressure vessel, which can be operated in a hostile environment, such as on an offshore oil production facility or at the seabed.

The invention claimed is:

1. A separator for separating out a flow into a first fluid, a second fluid which is denser than the first fluid, and solids, the separator comprising:
   a vessel;
   a cyclone contained within the vessel;
   an inlet passage passing through a wall of the vessel and into the cyclone;
   an upper end of the cyclone being open to and in fluid communication with an interior of the vessel and defining a passage portion in fluid communication with an interior of the cyclone and with the interior of the vessel;
   a first outlet passage in fluid communication with an exterior of the vessel, wherein the first outlet passage is separate from the passage portion;
   a second outlet passage for the second fluid extending from a base of the vessel; and
   a third outlet passage for the solids extending from a lower end of the cyclone to the exterior of the vessel;
   wherein the third outlet passage includes a fluidizing unit situated in the cyclone.

2. A separator as claimed in claim 1, wherein the vessel is substantially symmetrical about its central vertical axis.

3. A separator as claimed in claim 1, wherein the vessel is cylindrical.

4. A separator as claimed in claim 1, wherein the means for causing the flow to rotate within the cyclone comprises shaping or aligning the inlet passage to direct inlet flow away from the central axis of the cyclone.

5. A separator as claimed in claim 1, wherein a gas vent is provided in an upper part of the vessel.

6. A separator as claimed in claim 1, wherein a filter is provided in a space between the cyclone and the vessel.

7. A separator as claimed in claim 1, wherein a further passage is provided for ducting water to the fluidizing unit.

8. A separator as claimed in claim 1, wherein a vortex seat or core finder is positioned in the cyclone above the fluidizing unit.

9. A separator as claimed in claim 1, wherein a gas inlet and distributor means is provided in the base of the vessel.

10. A separator as claimed in claim 1, wherein the second outlet passage is controlled by a vortex valve level control means.

11. A separator as claimed in claim 1, wherein the first outlet passage has slots which open into a part of the cyclone at which the first fluid accumulates as it separates out.

12. A separator as claimed in claim 1, wherein a core shield is provided at an open end of the cyclone.

13. A system including a separator as claimed in claim 1, comprising
   a pipeline connected to the first outlet of the separator,
   a pump in the pipeline for increasing the pressure of flow through the first outlet, and an inductor or jet pump in the pipeline downstream of the pump, the inductor or jet pump being connected to a gas vent of the separator.

14. A system as claimed in claim 13, wherein the pipeline is connected to downstream equipment at a higher pressure than the separator.

15. A separator as claimed in claim 1, wherein the passage portion provides:
  means for permitting the second fluid to overflow from within the cyclone and into the vessel.

16. A separator as claimed claim 1, wherein the first outlet passage provides:
  means for permitting communication of the first fluid from within the cyclone to the exterior of the vessel.

17. A separator as claimed in claim 1, wherein inlet passage provides:
  means for rotating the flow within the cyclone.

18. A separator as claimed in claim 1, further comprising:
  a substantially tubular member having a proximal end and a distal end, wherein the first outlet passage is formed in the distal end of the substantially tubular member.

19. A separator as claimed in claim 18, wherein the proximal end is arranged within the cyclone, wherein the distal end is arranged exterior to the vessel, wherein the substantially tubular member
  extends from the proximal end arranged within the cyclone,
  through the passage portion, and
  through and beyond the wall of the vessel such that the distal end including the first outlet passage is arranged exterior to the vessel.

20. A separator as claimed in claim 18, wherein the substantially tubular member extends substantially on a central axis of the cyclone.

21. A separator as claimed in claim 18, wherein the substantially tubular member is
  a dip tube that extends to a position within the cyclone and substantially upon the central axis of the cyclone.

22. A separator for separating out a flow into a first fluid, a second fluid which is denser than the first fluid, and solids, the separator comprising:
  a vessel;
  a cyclone contained within the vessel;
  an inlet passage passing through a wall of the vessel and into the cyclone;
  an upper end of the cyclone being open to and in fluid communication with an interior of the vessel and defining a passage portion in fluid communication with an interior of the cyclone and with the interior of the vessel;
  a first outlet passage in fluid communication with an exterior of the vessel, wherein the first outlet passage is separate from the passage portion;
  a second outlet passage for the second fluid extending from a base of the vessel; and
  a third outlet passage for the solids extending from a lower end of the cyclone to the exterior of the vessel;
  wherein the first outlet passage has slots which open into a part of the cyclone at which the first fluid accumulates as it separates out.

23. A separator for separating out a flow into a first fluid, a second fluid which is denser than the first fluid, and solids, the separator comprising:
  a vessel;
  a cyclone contained within the vessel;
  an inlet passage passing through a wall of the vessel and into the cyclone;
  an upper end of the cyclone being open to and in fluid communication with an interior of the vessel and defining a passage portion in fluid communication with an interior of the cyclone and with the interior of the vessel;
  a first outlet passage in fluid communication with an exterior of the vessel, wherein the first outlet passage is separate from the passage portion;
  a second outlet passage for the second fluid extending from a base of the vessel; and
  a third outlet passage for the solids extending from a lower end of the cyclone to the exterior of the vessel;
  a pipeline connected to the first outlet of the separator,
  a pump in the pipeline for increasing the pressure of flow through the first outlet, and an inductor or jet pump in the pipeline downstream of the pump, the inductor or jet pump being connected to a gas vent of the separator.

24. A separator for separating out a flow into a first fluid, a second fluid which is denser than the first fluid, and solids, the separator comprising:
  a vessel;
  a cyclone contained within the vessel;
  an inlet passage passing through a wall of the vessel and into the cyclone;
  an upper end of the cyclone being open to and in fluid communication with an interior of the vessel and defining a passage portion in fluid communication with an interior of the cyclone and with the interior of the vessel;
  a first outlet passage in fluid communication with an exterior of the vessel, wherein the first outlet passage is separate from the passage portion;
  a second outlet passage for the second fluid extending from a base of the vessel; and
  a third outlet passage for the solids extending from a lower end of the cyclone to the exterior of the vessel;
  a substantially tubular member having a proximal end and a distal end, wherein the first outlet passage is formed in the distal end of the substantially tubular member
  wherein the proximal end is arranged within the cyclone, wherein the distal end is arranged exterior to the vessel, wherein the substantially tubular member
  extends from the proximal end arranged within the cyclone,
  through the passage portion, and
  through and beyond the wall of the vessel such that the distal end including the first outlet passage is arranged exterior to the vessel.

* * * * *